United States Patent
Buswell (10) Patent No.: US 10,296,971 B2
(45) Date of Patent: May 21, 2019

(54) PROVIDING REAL-TIME TRADING OF VIRTUAL INFRASTRUCTURE RESOURCES

(71) Applicant: John I. Buswell, Athens, OH (US)

(72) Inventor: John I. Buswell, Athens, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 754 days.

(21) Appl. No.: 14/863,867

(22) Filed: Sep. 24, 2015

(65) Prior Publication Data

US 2016/0012523 A1    Jan. 14, 2016

Related U.S. Application Data

(63) Continuation of application No. 13/601,675, filed on Aug. 31, 2012, now abandoned.

(51) Int. Cl.
*G06F 15/173* (2006.01)
*G06Q 30/08* (2012.01)
*G06Q 10/06* (2012.01)
*H04L 12/911* (2013.01)

(52) U.S. Cl.
CPC ......... *G06Q 30/08* (2013.01); *G06Q 10/0631* (2013.01); *H04L 47/821* (2013.01)

(58) Field of Classification Search
CPC ... G06Q 30/08; G06Q 10/0631; H04L 47/821
See application file for complete search history.

(56) References Cited

U.S. PATENT DOCUMENTS

| | | | | |
|---|---|---|---|---|
| 8,606,920 | B1* | 12/2013 | Gupta | G06F 9/5011 709/226 |
| 8,676,622 | B1* | 3/2014 | Ward, Jr. | G06Q 10/06313 705/7.12 |
| 9,953,351 | B1* | 4/2018 | Sivasubramanian | G06Q 30/0283 |
| 2002/0095367 | A1* | 7/2002 | Mizunuma | G06Q 40/04 705/37 |
| 2006/0069621 | A1* | 3/2006 | Chang | G06F 9/505 705/26.1 |
| 2007/0073594 | A1* | 3/2007 | Schwartz | G06Q 30/02 705/26.3 |
| 2010/0145801 | A1* | 6/2010 | Chekuri | G06Q 10/06 705/14.51 |
| 2011/0158184 | A1* | 6/2011 | Agulnik | H04W 28/18 370/329 |

(Continued)

*Primary Examiner* — Mohamed A Wasel
(74) *Attorney, Agent, or Firm* — Shimokaji IP (57) ABSTRACT

A system can include program instructions embodied with the computer-readable storage medium and executable by a processor to cause the system to: automatically determine to make a bid for resources to add to a computer network of a client receive, from a virtual marketplace, a communication indicating that the bid satisfies an offer for additional resources made by an infrastructure provider gateway; successfully negotiate a link with the infrastructure provider gateway such that the additional resources are thereby usable by the client as part of the computer network of the client integrate the additional resources with the computer network of the client and maintain the link with the infrastructure provider gateway until a period of time expires.

20 Claims, 7 Drawing Sheets

(56) References Cited

U.S. PATENT DOCUMENTS

| | | | |
|---|---|---|---|
| 2012/0179824 A1* | 7/2012 | Jackson | G06F 9/5027 709/226 |
| 2013/0042004 A1* | 2/2013 | Boss | G06F 9/5061 709/226 |
| 2018/0136979 A1* | 5/2018 | Morris | H04L 67/1097 |

* cited by examiner

PROVIDING REAL-TIME TRADING OF
VIRTUAL INFRASTRUCTURE RESOURCES

BACKGROUND

The present invention relates to virtual resources, and more specifically, to providing real-time trading of virtual infrastructure resources.

Currently, communication between parties may be increasingly dependent on using networking lines. The infrastructure to support telecommunications is being increasingly developed to satisfy the demand. Some organizations, especially larger entities, have prepared for future needs. For example, some organizations have developed an infrastructure capacity ready to handle increasing needs in bandwidth, computing power, and storage availability. Such organizations have great flexibility in meeting their needs. However, often these resources may be underutilized until times of peak demand arise.

There are also entities with much less flexibility in their capacity to handle peak demands requiring increased networking resources. An entity may opt to not own on a full time basis, excess capacity. Some entities may only need transient demands for increased networking resources. For example, a small office may wish to host a web based seminar that may be attended by several invitees. Typically, on a day-to-day basis, such an office may need only enough resources to host a website, which may be well below the capacity needed to host a web based seminar.

SUMMARY

According to one embodiment of the present invention, a computer program product for providing trading of network infrastructure resources comprises a computer readable storage medium having computer readable program code embodied therewith. The computer readable program code is configured to: receive, from a first entity over a network, an offer of network resources available for purchase at an offer price; receive, from a second entity over the network, a bid to purchase network resources at a bid price; determine, by a processing unit, whether the bid is satisfied by the offer; and transact a sale of network resources from the first entity to the second entity if the bid is satisfied by the offer.

According to another embodiment of the present invention, a server comprises a memory module configured to receive, over a network, a plurality of offers of network resources available for purchase at respective offer prices and a plurality of bids to purchase network resources at respective bid prices; a processing unit coupled to the memory module. The memory module is also configured to analyze the plurality of offers and the plurality of bids, identify one or more bids satisfying one or more offers, and transact a sale of network resources between one of the one or more bids and one of the one or more offers.

According to yet another embodiment of the present invention, a virtual marketplace comprises a plurality of virtual servers in a network configured to submit bids and offers on network resources, and a virtual marketplace server in communication with the plurality of virtual servers. The virtual marketplace server is configured to coordinate sales between received bids and offers on network resources.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer may not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
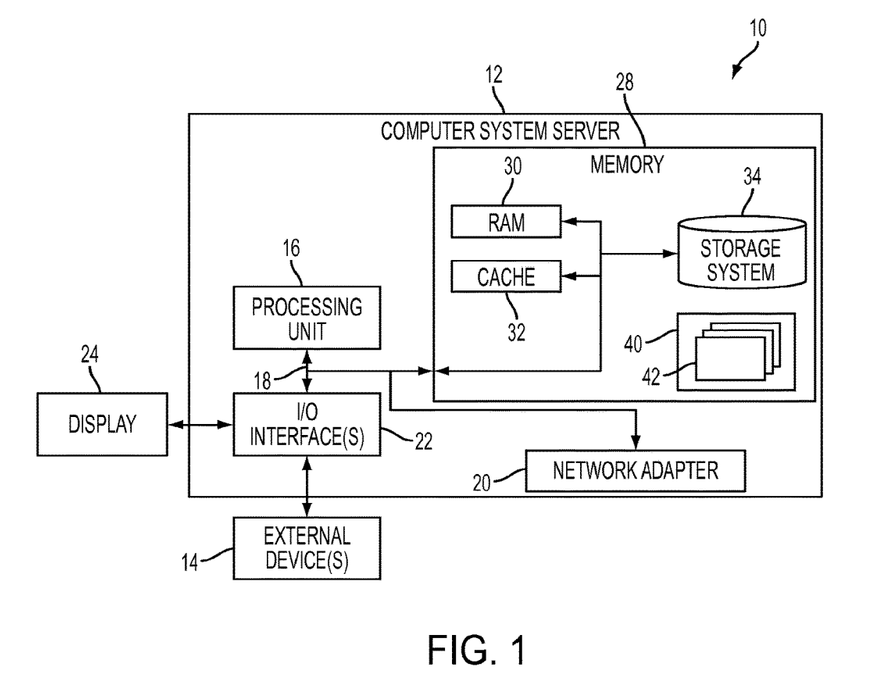
FIG. 1 depicts a cloud computing node according to an embodiment of the present invention.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
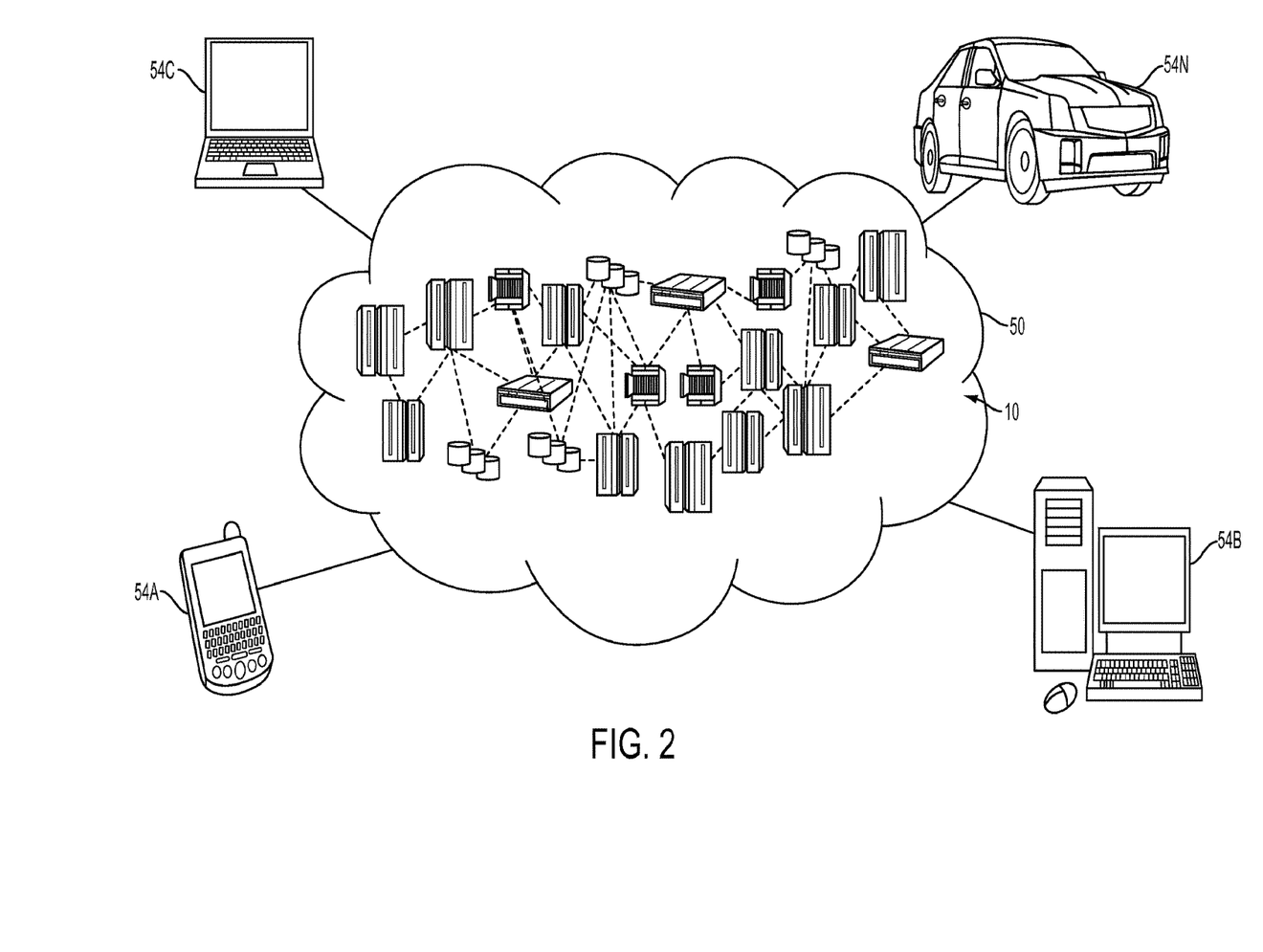
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone 54A, desktop computer 54B, laptop computer 54C, and/or an automobile computer system 54N may communicate. The nodes 10 may communicate with one another. They may be grouped (not shown) physically or virtually, in one or more networks, such as Private, Community, Public, or Hybrid clouds as described hereinabove, or a combination thereof. This allows the computing environment 50 to offer infrastructure, platforms and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
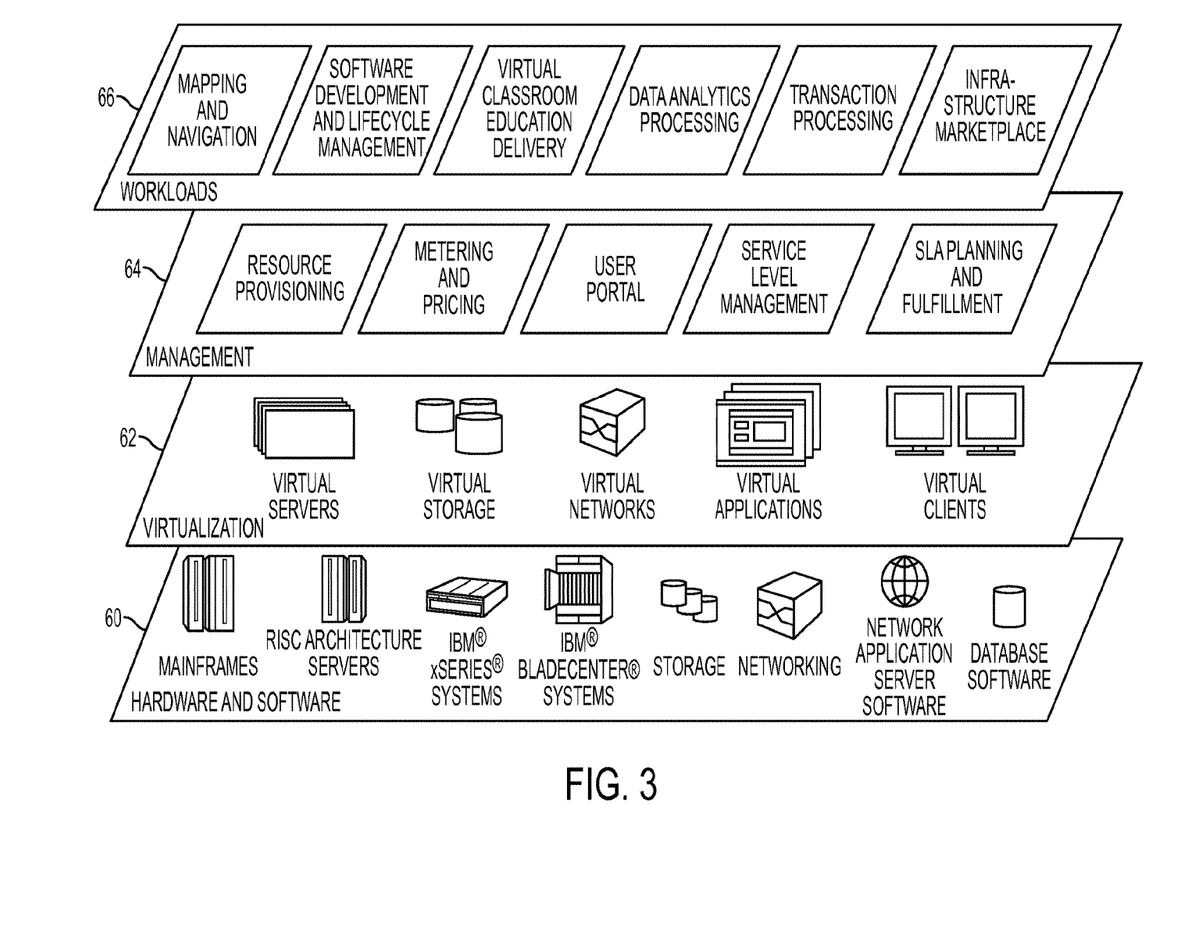
FIG. 3 depicts abstraction model layers according to yet another embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

A workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and providing and managing a virtual marketplace.

Figure 4:
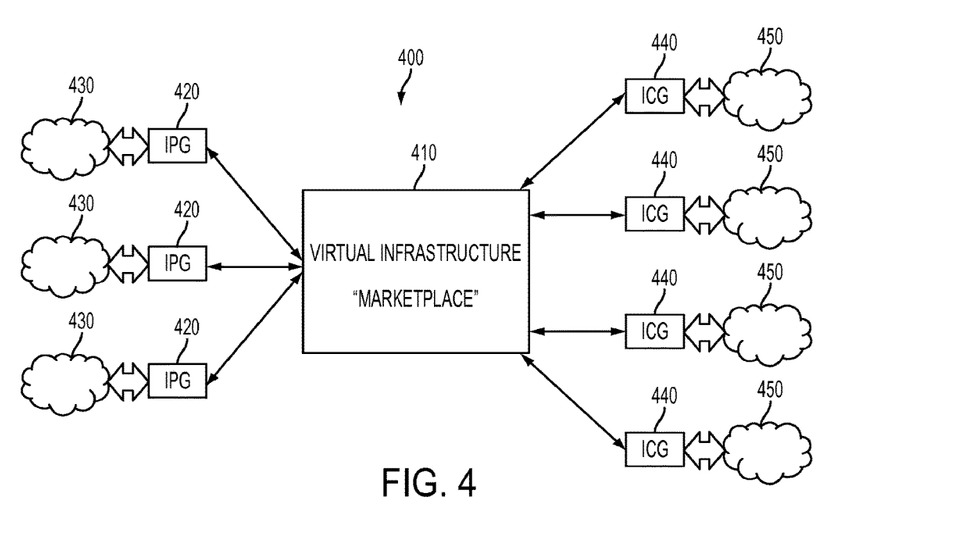
FIG. 4 is a block diagram of a virtual marketplace according to still another embodiment of the present invention.

Referring now to FIG. 4, a block diagram of a virtual marketplace 400 according to an exemplary embodiment of the present invention is shown. The virtual marketplace 400 may provide a trading platform for exchanging network infrastructure or resources between network resource owners and network resource customers. For example, the virtual marketplace 400 may include a marketplace server 410 connected to a plurality of servers 420 and 440. The marketplace server 410 may be, for example, the computer/server 12 of FIG. 1. For sake of illustration, it will be understood that actions described herein out may be performed for example, by the processing unit 16 and the memory module 28 without direct reference thereto. In an exemplary embodiment, the servers 420 may be designated infrastructure provider gateways (IPG) (also referred to as IPGs 420). The IPGs 420 may be connected to network resources 430. The servers 440 may be designated as infrastructure client gateways 440 (also referred to as ICGs 440). The ICGs 440 may be connected to networks 450. The IPGs 420 may be controlled by entities who may make available network resources 430 to those in control of the networks 450. The ICGs 440 may be controlled by entities that may need extra network resources 430 to supplement their networks 450.

In an exemplary embodiment, varying amounts of network resources 430 may be made available to owners of the networks 450 when extra capacity in the networks 450 may be required. Network resources 430 may be announced for sale as offers through respective IPGs 420 to the marketplace server 410. An exemplary offer for sale may include an offer price, a type of network resource 430, and duration of access to the network resource 430. Networks 450 needing extra capacity may place a bid through respective ICGs 440 for network resources 430. An exemplary bid may include a bid price, a type of network resource 430 wanted, and duration of use. The marketplace server 410 may serve as an intermediary pairing those networks 450 with available network resources 430 when an offer of available network resources 430 is matched with a corresponding bid for network resources 430. In some embodiments, the IPGs 420 and the ICGs 440 may be embedded in the virtualization manager 410 as a separate virtual appliance or may be a physically separate device.

Figure 5:
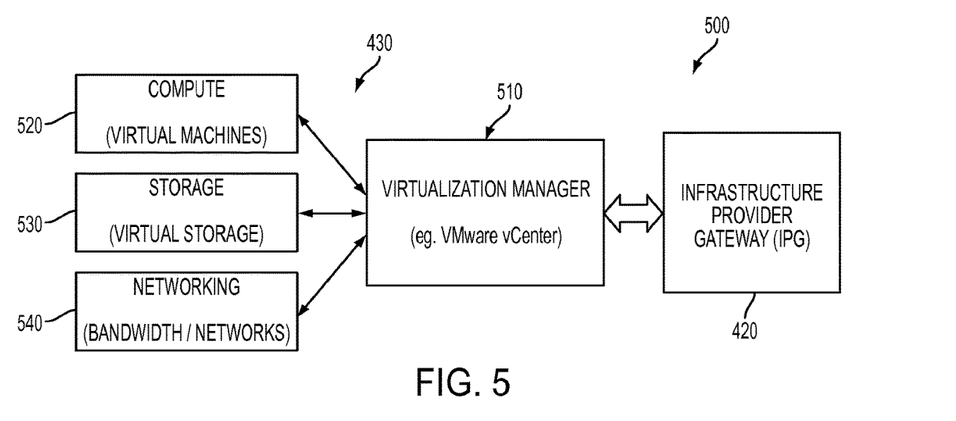
FIG. 5 is a block diagram of a provider side of the virtual marketplace of FIG. 4.

Referring now to FIG. 5, a detailed view of a network resource provider side 500 in the virtual marketplace 400 is shown. This would be an organization who wants to sell network infrastructure to third parties. In an exemplary embodiment, the sale of network resources 430 may be for a definite time, for example, under a lease. In some embodiments, the sale of network resources 430 may be offered as a traded commodity or auctioned to the highest available bidder. In some embodiments, the network resources may be unused or underutilized excess capacity of the provider's which the provider wishes to leverage by making available to third parties. In other embodiments, the network resources 430 may be used primarily for sale.

Figure 6A:
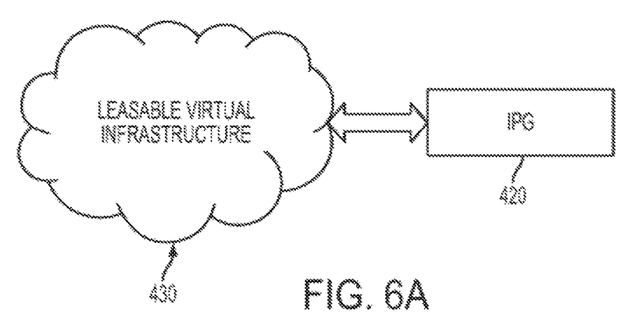
FIG. 6A is a block diagram of a provider gateway in connection with network resources of FIG. 4.

Referring now to FIGS. 5 and 6A concurrently, a single IPG 420 is shown in connection with network resources 430, however it will be understood that other IPGs 420 may share a similar configuration. The IPG 420 may be connected to a virtualization manager 510 which may have access to network resources 430 available for sale. The network resources 430 may be, for example, compute type resources 520, storage type resources 530, or networking type elements 540 (for example, bandwidth or network machines). In some embodiments, the network resources 430 may be physical devices; for example, the compute type resources 520 may be processors, the storage type resources 530 may be disk drive space, the networking type elements 540 may be physical switches, routers, servers or access through the switches, routers, servers, or telecommunications lines. In some embodiments, the network resources 430 may be virtualization or cloud components. For example, the compute type resources 520 may be virtual machines, the storage type resources 530 may be virtual storage areas, and the networking type elements 540 may be virtual switches, virtual networks, or bandwidth.

The virtualization manager 510 may be responsible for managing the availability of a range of compute, storage and networking inventory. In an exemplary embodiment, the IPG 420 may instruct the virtualization manager 510 to create, modify or destroy access to network resources 430. For example, under a leased access to network resources 430, the type and amount of network resources 430 available to a purchaser may be monitored and the duration of use may be terminated at the end of a lease period. The IPG 420 may instruct the virtualization manager 510 on how to group and isolate network resources 430. The provider (network resource owner) may configure availability of either a dynamic allocation of network resources 430, a static allocation or a combination of both on the IPG 420. This may enable the provider to control how much of the network resources 430 is committed for short-term and/or long-term lease by third parties.

Figure 6B:
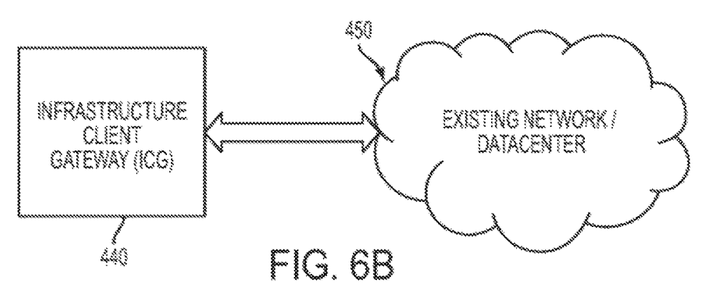
FIG. 6B is a block diagram of a client gateway in connection with a network of FIG. 4.

Referring now to FIG. 6B, an exemplary client or purchaser side of the virtual marketplace 400 is shown. The client side may be an organization that wants to purchase networking infrastructure from third parties. The purchase may be on either a short-term or long-term basis. The client may need to meet peak or seasonal demands which may not justify the cost of investment in dedicated physical or virtual infrastructure. For example, a local television station may have a web page that displays winter school and business closings due to snow. This type of seasonal event results in high-demands on the web servers in the evenings and before school starts in the mornings. There may be many users looking to see if a particular school is closed or on a delay. The television station may just need the resources necessary to meet the compute and networking requirements for these peak periods. The ICG 440 may enable this entity to access extra network resources through the virtual marketplace 400. Thus, the client may leverage leasable unused infrastructure of third parties at a lowest possible cost. The ICG 440, using criteria configured by the client may negotiate the best possible rate for those resources. Once acquired, the client may then automatically deploy, for example virtual machines into those resources and extend an overlay network. The purchased network resources 430 (FIG. 6A) may be extended to an existing network 450 or datacenter, so that the extra resources appear to be part of the existing network 450.

Figure 7:
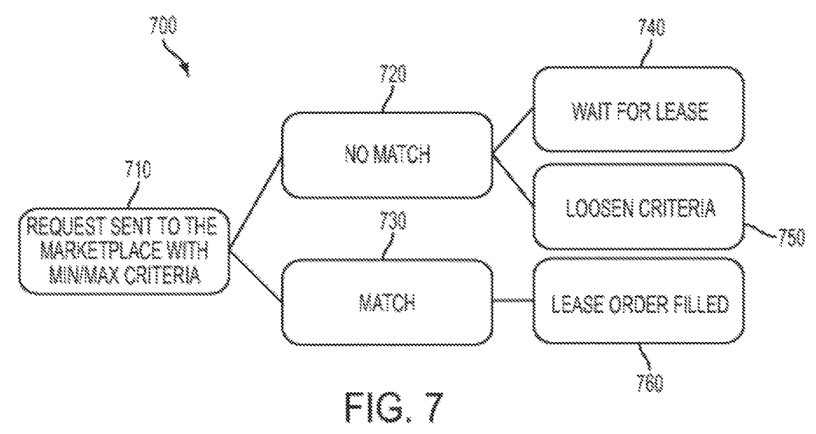
FIG. 7 is a flowchart of a process of bidding according to yet another embodiment of the present invention.

Referring now to FIG. 7, an exemplary bid process 700 is shown. The bid process 700 may include a request (bid) sent (710) to the virtual marketplace 400 (FIG. 4). The bid may include for example, a type of resources wanted, a duration of use, and a bid price for the resource. In some embodiments, the bid price may be fixed or may be a price range including a minimum and maximum price. In some embodiments, an amount of resources may be included in the bid including a minimum and maximum amount of resources wanted. A successful bid may be paired (730) to a willing provider who made available resources that meet the criteria of the bid. When paired, the purchase may be filled (760) and resources may be made available to the bidder. An unsuccessful bid may result (720) in an unfilled order. The bidder may then have the option to wait (740) for the bid to be paired with a willing provider or may adjust (750) the bid criteria. For example, the minimum and maximums set in the bid may be loosened so that more opportunities to fill the bid may be available.

Figure 8:
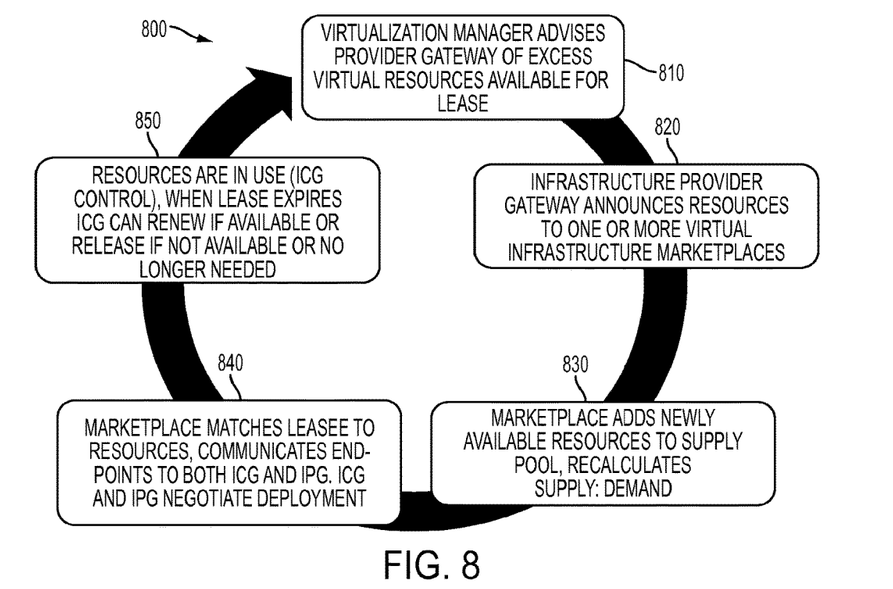
FIG. 8 is a flowchart of a process of provider side actions according to still yet another embodiment of the present invention.

Referring now to FIG. 8, a process 800 of making network resources available by an infrastructure provider is shown. The virtualization manager 510 (FIG. 5) may notify (810) the IPG 420 of excess resources available for lease. This may be triggered for example by a usage level threshold being attained. For example, excess resources may be automatically made available for sale when more than 25% of resources are idle on a network 430 (FIG. 4). In some embodiments, unused resources maybe powered down until sold. The IPG 420 may generate (820) an availability announcement based on criteria pre-configured by the system administrators. The announcement may then be made to the virtual marketplace 410 through a network, for example, the Internet. The virtual marketplace 410 may add (830) the newly available resources to the supply pool. When the resources are added to a lease order, the marketplace may communicate (840) a match to the ICG 440 and to the IPG 420 corresponding to the bid satisfying the offer of available resources. In some embodiments, offers may be sold closer to the maximum bid price than to the minimum bid price when a supply of available network resources decreases within the virtual marketplace 410. The two endpoints (IPG 420 and ICG 440) may then negotiate with each other. Upon successful negotiation, the resources are then used (850) by the client. The ICG 440 and IPG 420 may maintain a negotiated link until the lease is up. For example, the resources may be made available to the ICG 440 via the IPG 420. In some embodiments, the negotiated link may provide monitoring and a control plane. In other embodiments, the negotiated link may be used for a secure data plane (e.g. VPN link). In some embodiments, the IPG 420 may tell the ICG 440 how to access the resources directly (outside of the gateways), but the link might remain up to allow fast re-negotiation, monitoring and alerts. For example the ICG 440 may need to be made aware if there is a facility failure, such as a power failure, at the provider. As the lease approaches expiration, the resources can be re-requested from the IPG 420. If the IPG 420 indicates the resources are unavailable, the ICG 440 must negotiate new resources with the virtual marketplace 410 and release the resources it is currently using when the lease is up. If the ICG 440 no longer needs the resources when the lease expires, but the resources are still available for lease, the IPG 420 may announce to the virtual marketplace 410 that the resources are available again. The process 800 may continue until the virtualization manager 510 advises the provider that the resources are no longer available.

Figure 9:
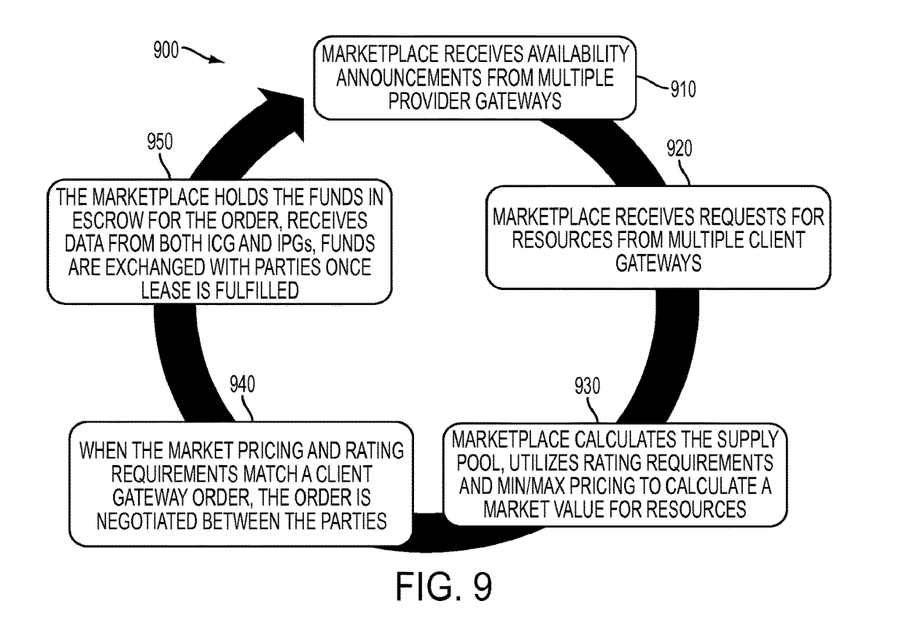
FIG. 9 is a flowchart of a process of virtual marketplace offer/bid transactions according to still yet another embodiment of the present invention.

Referring now to FIG. 9, a process 900 of marketplace handling of bids and offers is shown. The virtual marketplace 410 (FIG. 4) may receive (910) announcements of available network resources from one or more providers. The virtual marketplace 410 may receive (920) requests for resources from one or more clients. In some embodiments, the virtual marketplace 410 may be configured to calculate (930) the supply and demand for a particular set of resources over a period of time and calculate a market price from the minimum supply price and maximum demand price. The virtual marketplace 410 may be configured to fill orders (940) on a first come first serve basis, on a basis of the highest bidder, on a basis of the lowest supplier pricing, or a combination of all three. Other criteria not described here may also be employed. In calculating pricing, the virtual marketplace 410 may consider ratings requirements and may remove supply/demand (offer/bid) requests that do not meet those ratings requirements. Highest ratings requirements may be filled first. For example, highest quality rated services may be sold before lower rated services. The ICG 440 (FIG. 4) may be configured to accept poorer quality services at a lower price range, if higher quality services are unavailable. The virtual marketplace 410 may hold funds in escrow (950) until the client and provider agree to terms. Once lease terms are satisfied, funds may be released to the provider.

It may be appreciated that the virtual marketplace 410 allows providers to lease unused/excess virtual infrastructure over short-term (hours), medium term (days/weeks) and long-term (months) periods. The virtual marketplace 410 may be configured to create virtual market pricing based on supply and demand for resources. This may enable suppliers to lease out unused resources at the maximum possible price rather than having idle resources consuming power. The virtual marketplace 410 may allow clients to lease virtual infrastructure at pricing that meets their budgets. For example, an engineering group may need a large number of resources to run a test, but they may be willing to wait 7-14 days or to run the test during off-peak times. Thus, this client may place an order which may have the flexibility to wait 2-3 days to be filled at a lower price, than an e-commerce web site that may receive unexpected high levels of traffic and may need to pay more for resources that are urgently needed to meet demand. Thus virtual marketplace 410 may make it possible for cloud providers to set market driven pricing rather than fixed pricing.

Figure 10:
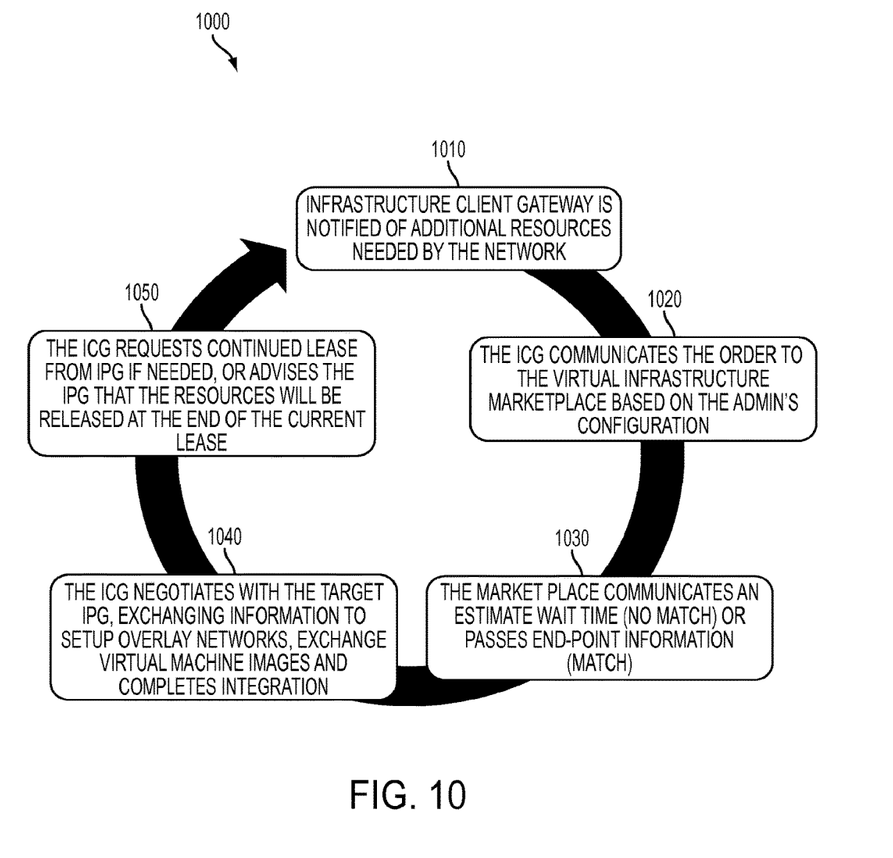
FIG. 10 is a flowchart of a process of client side actions according to still yet another embodiment of the present invention

Referring now to FIG. 10, a client side bid process 1000 is shown. Client bids may be handled by the ICG 440 (FIG. 4). The client may be notified (1010) by the ICG 440 or some other internal mechanism of when additional resources are needed. The ICG 440 may be configured with criteria that automatically determine when to make a bid for resources. The criteria may include daily, weekly or monthly spending limits. The criteria may include quality requirements based on the group/VLAN/virtualization manager requesting the leased resources. The criteria may include access control lists for leased resources and trust requirements for the virtual infrastructure provider. This information may be communicated (1020) to the marketplace as part of a bid. The virtual marketplace 410 may respond (1030) to the ICG 440 with an estimated wait time or by notifying the gateway that the criteria is too strict, at which point the gateway by configuration may loosen the requirements, try another virtual marketplace 410 (FIG. 4) or bring up powered down resources through a local private cloud (virtualization manager).

When a match with a provider is found an exchange (1040) of client and provider information may be performed. The ICG 440 may be given the target IPG's 420 information, the two end-points may negotiate the connection, setup overlay networks, exchange virtual machine images and complete the negotiation, at which point the resources will be available for use. When the lease comes close to expiration, the ICG 440 may notify (1050) the IPG 420 if the ICG 440 wants to continue leasing the resources or if it will release the resources. If the IPG 420 agrees to continue leasing, a new lease period may be negotiated between the IPG 420 and ICG 440. If not, the ICG 440 may release the resources and negotiate a new allocation with the virtual marketplace 410.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    an infrastructure client gateway automatically determining to make a bid for resources to add to a computer network of a client needing the resources for a period of time to satisfy a requirement;
    the infrastructure client gateway receiving, from a virtual marketplace, a communication indicating that the bid satisfies an offer for additional resources made by an infrastructure provider gateway;
    the infrastructure client gateway successfully negotiating a link with the infrastructure provider gateway such that the additional resources are thereby usable by the client as part of the computer network of the client for the period of time to satisfy the requirement; and the infrastructure client gateway maintaining the link with the infrastructure provider gateway to integrate the additional resources with the computer network of the client until the period of time expires.

2. The method of claim 1, wherein the link provides monitoring and a control plane.

3. The method of claim 1, wherein the link is usable as a secure data plane.

4. The method of claim 1, further comprising the infrastructure client gateway receiving an alert via the link, the alert indicating that there is a failure at a facility of a provider of the additional resources.

5. The method of claim 1, further comprising the infrastructure client gateway engaging in an exchange of virtual machine images with the infrastructure provider gateway.

6. The method of claim 1, further comprising the infrastructure client gateway setting up an overlay network with the infrastructure provider gateway.

7. The method of claim 1, further comprising:
the infrastructure client gateway receiving a notification from the virtual marketplace that criteria in a second bid for resources are too strict, and in response, the infrastructure client gateway bringing up powered down resources through a local private cloud.

8. The method of claim 7, wherein the criteria include trust requirements for a provider of the resources.

9. The method of claim 7, wherein the criteria include access control lists for leased resources.

10. A computer program product comprising a non-transitory computer-readable storage medium having program instructions embodied therewith, the program instructions executable by a processor of an infrastructure client gateway to cause the infrastructure client gateway to:
automatically determine to make a bid for resources to add to a computer network of a client needing the resources for a period of time to satisfy a requirement;
receive, from a virtual marketplace, a communication indicating that the bid satisfies an offer for additional resources made by an infrastructure provider gateway, the virtual market place being different from the infrastructure provider gateway;
receive at least one endpoint for the infrastructure provider gateway from the virtual marketplace;
successfully negotiate a link with the infrastructure provider gateway via the at least one endpoint such that the resources are thereby usable by the client as part of the computer network of the client for the period of time to satisfy the requirement; and
maintain the link with the infrastructure provider gateway until the period of time expires.

11. The computer program product of claim 10, wherein the link provides monitoring and a control plane.

12. The computer program product of claim 10, wherein the link is usable as a secure data plane.

13. The computer program product of claim 10, wherein the program instructions are further executable by the processor of the infrastructure client gateway to cause the infrastructure client gateway to receive an alert via the link, the alert indicating that there is a failure at a facility of a provider of the additional resources.

14. The computer program product of claim 10, wherein the program instructions are further executable by the processor of the infrastructure client gateway to cause the infrastructure client gateway to engage in an exchange of virtual machine images with the infrastructure provider gateway.

15. The computer program product of claim 10, wherein the program instructions are further executable by the processor of the infrastructure client gateway to cause the infrastructure client gateway to set up an overlay network with the infrastructure provider gateway.

16. The computer program product of claim 10, wherein the program instructions are further executable by the processor of the infrastructure client gateway to cause the infrastructure client gateway to receive a notification from the virtual marketplace that criteria in a second bid for resources are too strict, and in response, to bring up powered down resources through a local private cloud.

17. The computer program product of claim 16, wherein the criteria include trust requirements for a provider of the resources.

18. The computer program product of claim 16, wherein the criteria include access control lists for leased resources.

19. A system comprising a processor, a computer-readable storage medium, and program instructions embodied with the computer-readable storage medium and executable by the processor to cause the system to:
automatically determine to make a bid for resources to add to a computer network of a client needing the resources for a period of time to satisfy a requirement;
receive, from a virtual marketplace, a communication indicating that the bid satisfies an offer for additional resources made by an infrastructure provider gateway;
successfully negotiate a link with the infrastructure provider gateway such that the additional resources are thereby usable by the client as part of the computer network of the client for the period of time to satisfy the requirement;
integrate the additional resources with the computer network of the client; and
maintain the link with the infrastructure provider gateway until the period of time expires.

20. The system of claim 19, wherein the program instructions embodied with the computer-readable storage medium are further executable by the processor to cause the system to receive a notification from the virtual marketplace that criteria in a second bid for resources are too strict, and in response, to bring up powered down resources through a local private cloud.

* * * * *